US005484023A

United States Patent [19]
Shippee

[11] Patent Number: 5,484,023
[45] Date of Patent: Jan. 16, 1996

[54] FLOATING LAYER RECOVERY APPARATUS

[76] Inventor: James H. Shippee, P.O. Box 47, Vernon, Vt. 05354-0047

[21] Appl. No.: 324,966

[22] Filed: Oct. 18, 1994

[51] Int. Cl.[6] .................................................. E21B 43/00
[52] U.S. Cl. ............................................ 166/369; 210/109
[58] Field of Search ..................................... 166/369, 105, 166/105.1, 105.5; 210/922, 923, 109, 121, 123, 126, 242.1, 242.3; 222/187

[56] References Cited

U.S. PATENT DOCUMENTS

| | | | |
|---|---|---|---|
| 4,671,869 | 6/1987 | Hara et al. | 210/121 X |
| 4,998,585 | 3/1991 | Newcomer et al. | 166/369 X |
| 5,207,897 | 5/1993 | Baird et al. | 210/109 |
| 5,314,025 | 5/1994 | Priestly | 166/369 |

Primary Examiner—Michael Powell Buiz
Attorney, Agent, or Firm—Sughrue, Mion, Zinn, Macpeak & Seas

[57] ABSTRACT

A floating liquid layer detection and recovery apparatus and process are disclosed for selectively siphoning and storing a floating or sinking liquid layer and more specifically to an apparatus for raising floating hydrocarbons on groundwater or surface water to a higher point in a semi-closed system without a pump or an outside energy source once the apparatus is in place. In conjunction with this apparatus an apparatus is provided to create a cone of depression without a pump or outside energy source. Thicker floating liquids are siphoned to a higher point to a tank where water is first occupied and are separated by specific gravity. The water, being heavier, completes the remaining segment of the siphon to a point at or below the point of origin. Thinner floating liquid layers are siphoned under the lower end of a downcomer tube by capillary action along a fibrous media where capillary action of the lighter liquid continues upward joining the first siphon flow directly to the tank. The apparatus preferably includes a floating member buoyant in water so that it may rise and fall with changes in the water level. The two siphoning processes float the floating liquid layer to a thickness at or less than a sheen. A third siphon may be incorporated from a recovery point or well to another point or well with a lower watertable to create a cone of depression.

12 Claims, 11 Drawing Sheets

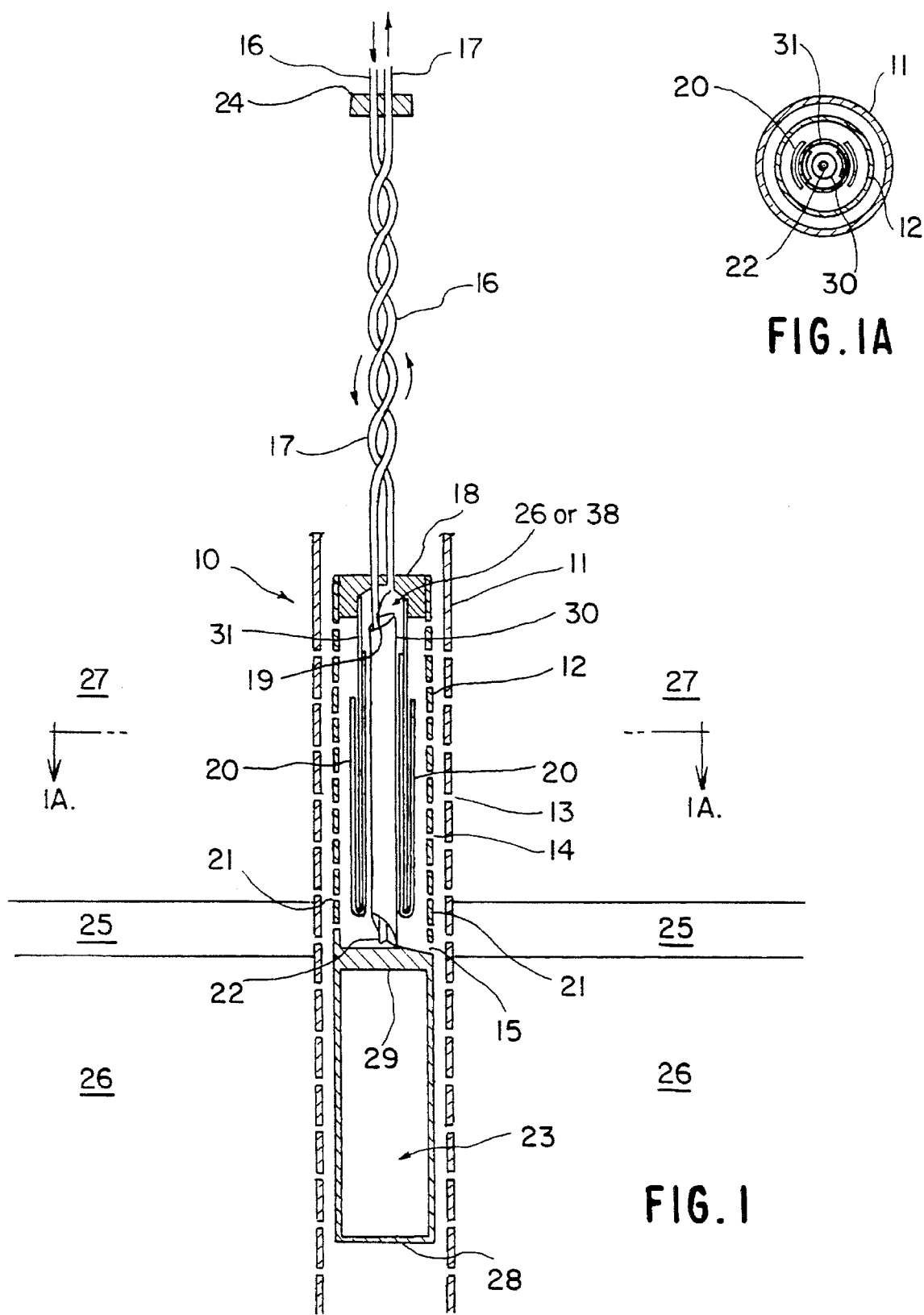

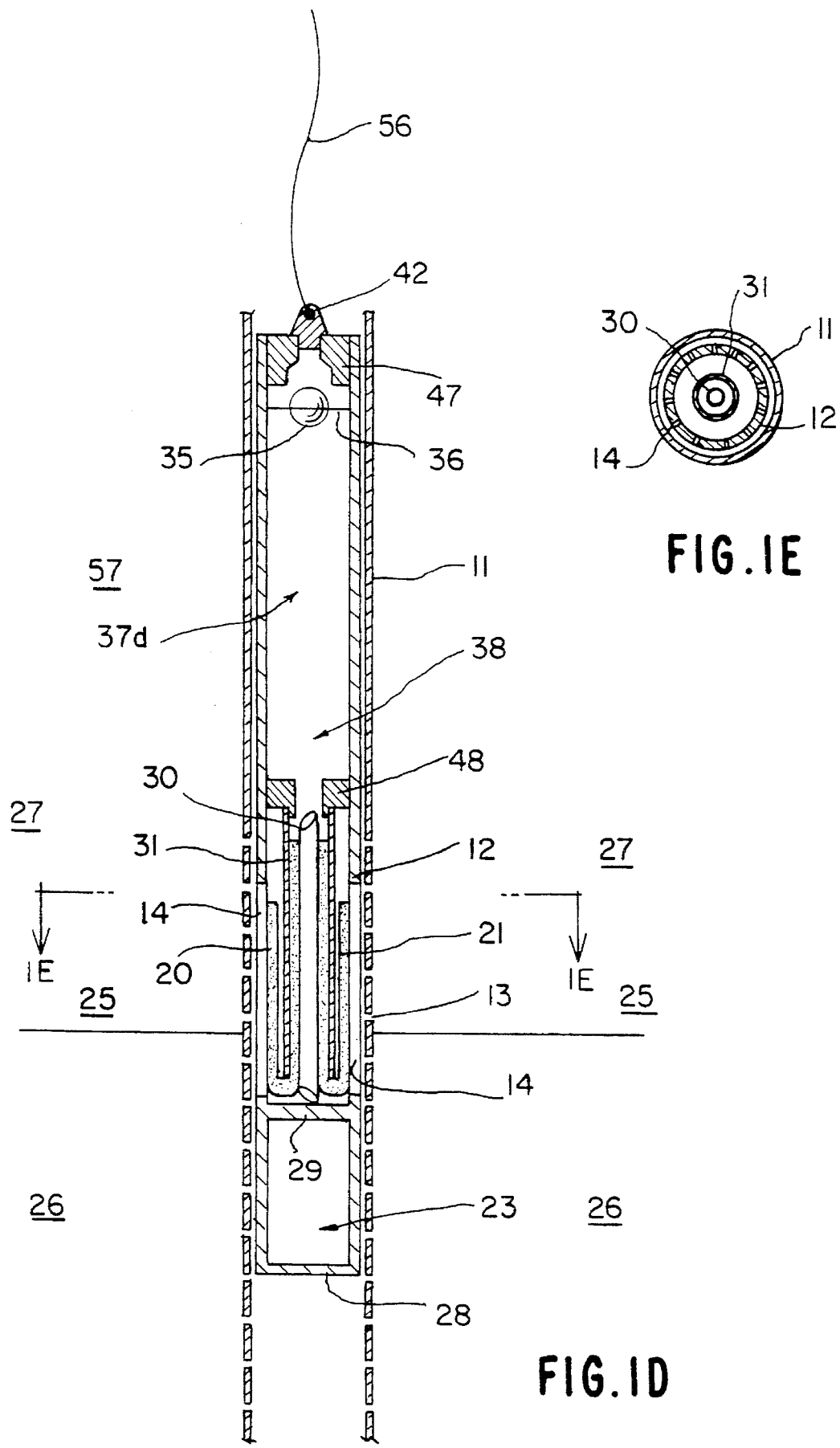

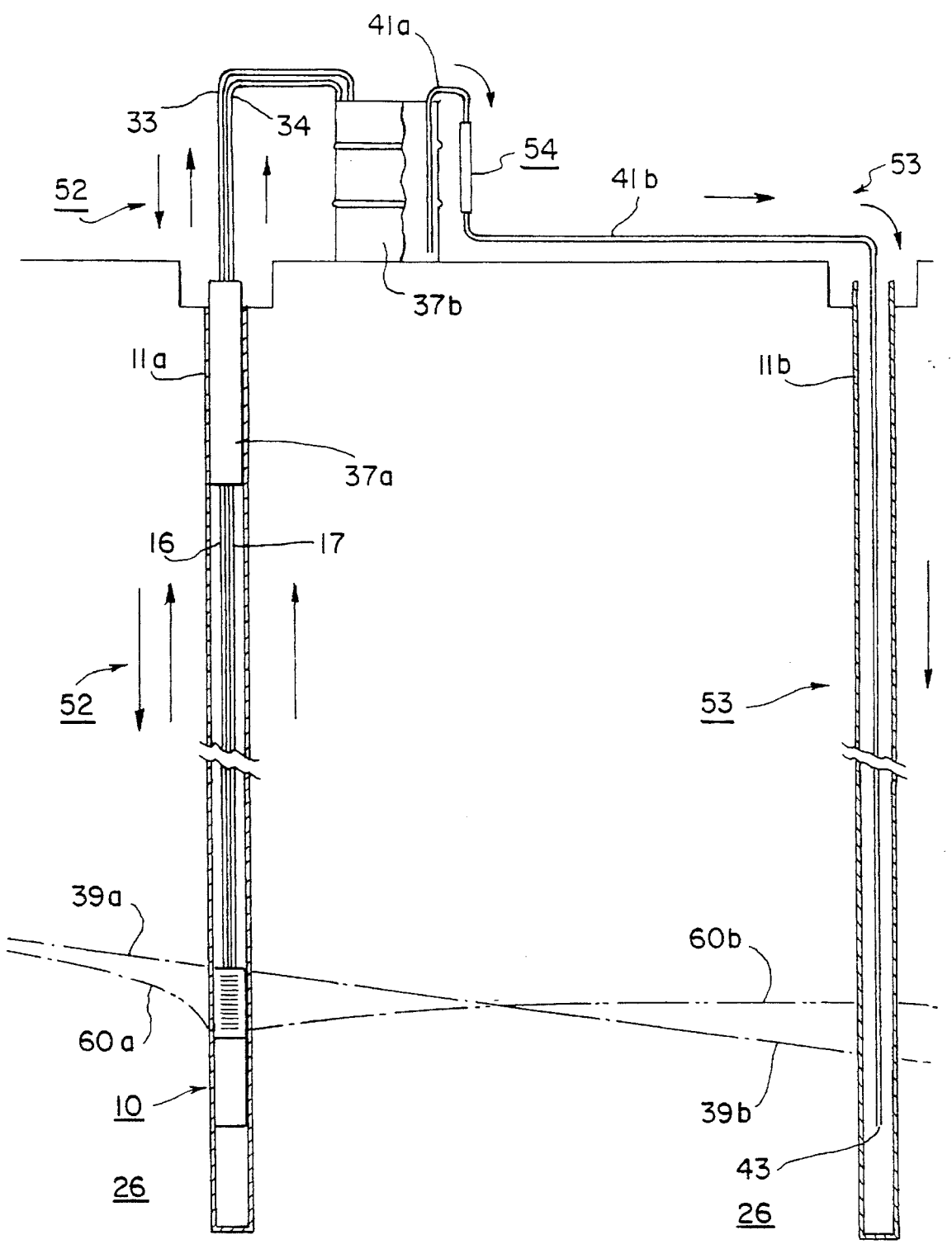

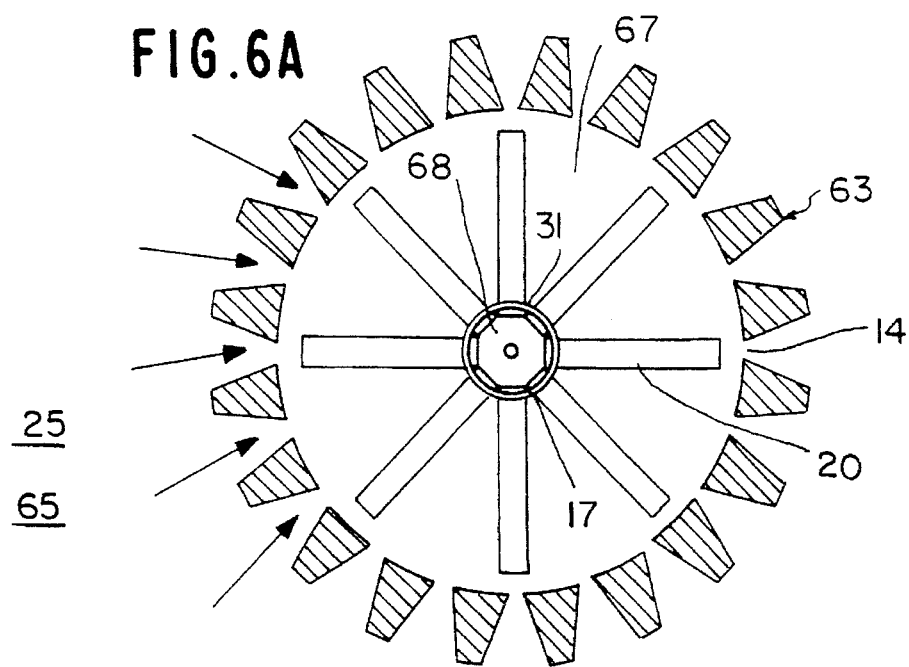
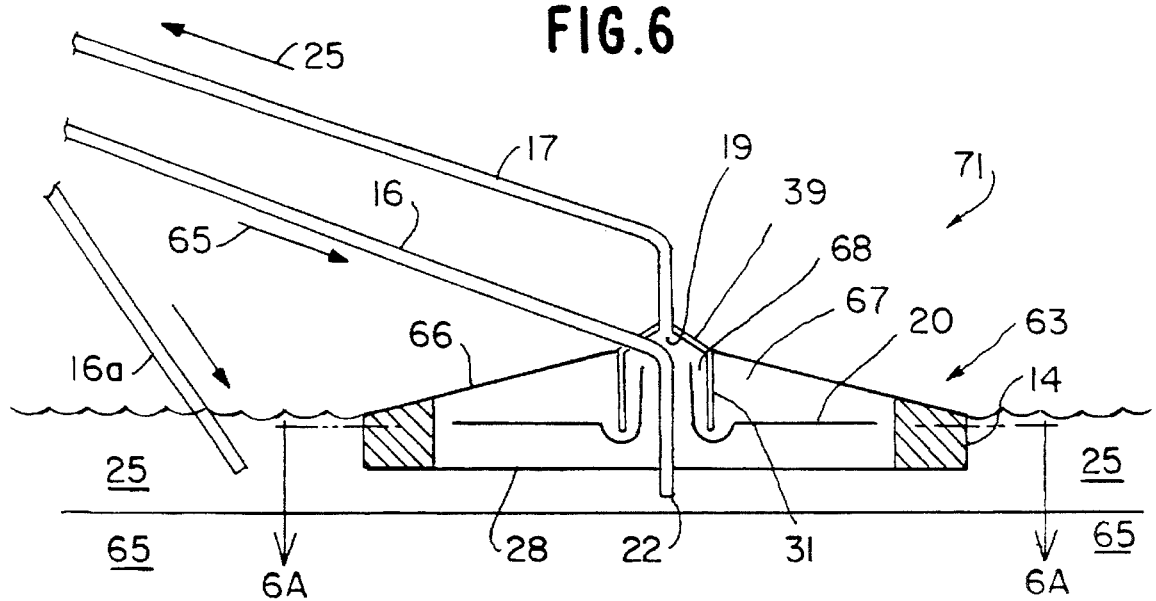

FLOATING LAYER RECOVERY APPARATUS

BACKGROUND OF THE INVENTION

1. Technical Field

This invention relates to a semi-closed fluid pumping method and apparatuses and, more precisely, to a system for removing floating hydrocarbon layers from the surface of groundwater.

2. Discussion

Various governmental regulations require monitoring of soil or groundwater quality in the vicinity of underground storage tanks (USTs) containing liquid hydrocarbons. In some cases, product releases or spills result in sufficient quantities such that a floating liquid layer may be detected. In response to this potential environmental risk, various means have been developed for release detection and product recovery. Prior art will show many devices for removing these floating liquid layers, known as "free product", from the groundwater. Most methods use pumps or labor intensive means.

For example, devices known as "filter canisters" can be installed in wells for early detection and recovery of free product. These devices are situated at or within the free product layer and groundwater interface. These devices are generally removed to monitor or to recover the free product. This becomes labor intensive in terms of the time required and the volume of product recovered. Such a discussion can be found in an article titled "Cutting the High Cost of Free Product Removal"—published in LUSTline (Bulletin 16, March 1992) which failed to recognize the extensive labor and time required to remedy the situation. Improvements to these devices include pumps to bring the collected liquids to a point at the surface. Most filter canister designs allow for some evaporation of volatile liquids as venting is required.

Other improved systems include a second pump used to lower the groundwater table creating a "cone of depression." This theory is meant to create a greater pressure gradient towards the recovery device which influences the mobile free product to migrate to this low point more quickly and in greater thickness. However, in this process the mobile free product is smeared through the soil creating a more widespread contamination of the soil, a greater product to water interface which increases groundwater contamination, a greater capillary fringe thereby reducing ultimate product mobility and ultimate final recovery, and removes naturally occurring bacteria which are important in the passive stages of soil and water decontamination. Furthermore, the pumped groundwater may require treatment before discharge. The ratio of groundwater pumped to product recovered is extremely high; on the order of 1,000:1 to 2,000:1.

Many devices will incorporate electronic sensors to control the overall process. Some systems, not always disclosed by Patents, discharge the pumped groundwater back to the aquifer at an up gradient location. This is known as a recharge system which will preserve some of the naturally occurring bacteria. However, many of these bacteria may still be destroyed by the pumping action.

Many devices inadvertently collect water in conjunction with a liquid hydrocarbon recovery process which may require separation, treatment or disposal of the recovered liquids. In some devices, a filter media or membrane is used to absorb or filter the hydrocarbons which may foul with microscopic bacteria, known as bio-fouling, and fail to collect floating product at all.

Yet in other devices, air is used to assist product recovery which results in volatile organic compound (VOC) emissions to the atmosphere and further treatment may be needed. VOC emissions also occur with the pumping of volatile liquids into vented containers. Few if any of theses devices offer "closed to the atmosphere" storage. Loss of constituents is very important in the analysis of chemical releases. For example, U.S. Pat. Nos. 2,457,851, 2,515,569, 2,520,056, and 2,770,492 show the moving transferring, supplying or dispensing of liquids to a lower level without filtering or separation. U.S. Pat. Nos. 622,088, 622,562, 4,280,658, 4,759,857, 4,761,226 filter or separate liquids to a lower level. None of these devices are closed siphons and none take advantage of the upper portion of the siphon.

In U.S. Pat. Nos. 3,669,275, 243,529, 4,243,529, 4,273,650, 4,663,037, 4,872,994, and 4,998,585 pumps are used to remove the floating liquid layers to an elevated location.

SUMMARY OF THE INVENTION

The present invention is directed to a method and apparatus to detect and recover a floating layer of liquid hydrocarbon from an open body of water or, groundwater, and to bring it to an elevated location, to avoid or reduce smearing of the floating liquid, to eliminate VOC emissions, to resist bio-fouling, and to preserve naturally occurring bacteria during mitigation or remediation efforts without the need for pumps and electrical controls. In the invention a buoyant section may be used to position a downcomer tube and optional capillary media assembly within the floating or sinking liquid layer or the position may be fixed. No electrical sensors, controls or pumps will be used making the system intrinsically safe. The invention may reside in a well with an inside diameter of 1 or more inches and more typically 2" to 4" in diameter. The invention may be used in a closed environment or on an open body of water.

In operation, the fixed position or floating assembly may be attached via one or more tubes to an intermediate tank or be attached to a remote storage tank or vessel which is closed to atmosphere. A portion of the attached tube or tubes may be coiled to facilitate the movement of the buoyant section during fluctuations in the liquid interface. The storage tank or vessel may be positioned within the well or above the surface within the barometric siphoning range of the floating liquid layer. More than one storage tank or vessel may be used in series or in parallel. Lighter than water liquid will enter a downcomer tube directly or along a capillary media and float up a single tube or one of two coiled tubes to the tank or vessel. The floating liquid will rise to the surface of the heavier liquid in the storage tank or vessel. The stored water will descend down a single tube or the second of the two coiled tubes to an elevation at below the floating liquid layer surface. It is the sum of the clockwise (CW) moments minus the sum of the counterclockwise (CCW) moments of the liquids that provides the motive force for this process. The stored liquid being closed to the atmosphere can not evaporate or be ignited. The floating or sinking liquid layer recovery process will stop once the floating liquid fills the recovery tank or vessel, returns down the single or second tube and reaches an elevation or point of pressure where the sum of the CW moments are equal to the sum of the CCW moments. The storage tank or vessel is then emptied of the floating liquid and refilled with the water to resume the recovery process.

For a cone of depression, the said second tube may be directed with an extended siphon to a down gradient well or point of lower pressure. A third tube may be used to convey the motive force siphon from the storage tank or vessel to a down gradient point or well or point of lower pressure. The third tube may siphon from a point below the floating liquid layer in the first well to a down gradient point or well or point of lower pressure. The cone of depression will be considered somewhat shallow compared to present industrial practice, on the order of ½ of the natural gradient between these two points. In most cases this will supply a sufficient cone of depression to significantly increase product recovery without adverse smearing. The cone of depression will adjust itself naturally to changes in watertable or interface elevations.

BRIEF DESCRIPTION OF THE DRAWINGS

FIG. 1 is a vertical cross section of the recovery portion of a floating liquid layer detection and recovery system, showing the well in which it resides, the groundwater and the floating liquid layer.

FIG. 1A is a cross sectional view taken along the line A—A FIG. 1.

FIG. 1D is a vertical cross section of a third embodiment of an integral floating liquid layer detection and recovery system used in groundwater monitoring.

FIG. 1E is a cross sectional view taken along line C—C FIG. 1D.

FIG. 3 is a vertical cross section of the preferred embodiment, an "in the well" storage tank, an above ground storage tank, a down gradient well, means to produce a cone of depression in a watertable and means to prevent floating liquid layer from entering a down gradient well.

FIG. 6 is a vertical cross section of the preferred embodiment of a floating liquid recovery system for use on an open body of water.

FIG. 6A is a sectional view taken along the line D—D in FIG. 6.

DETAILED DESCRIPTION OF THE PREFERRED EMBODIMENTS

Figures 1B, 1C:
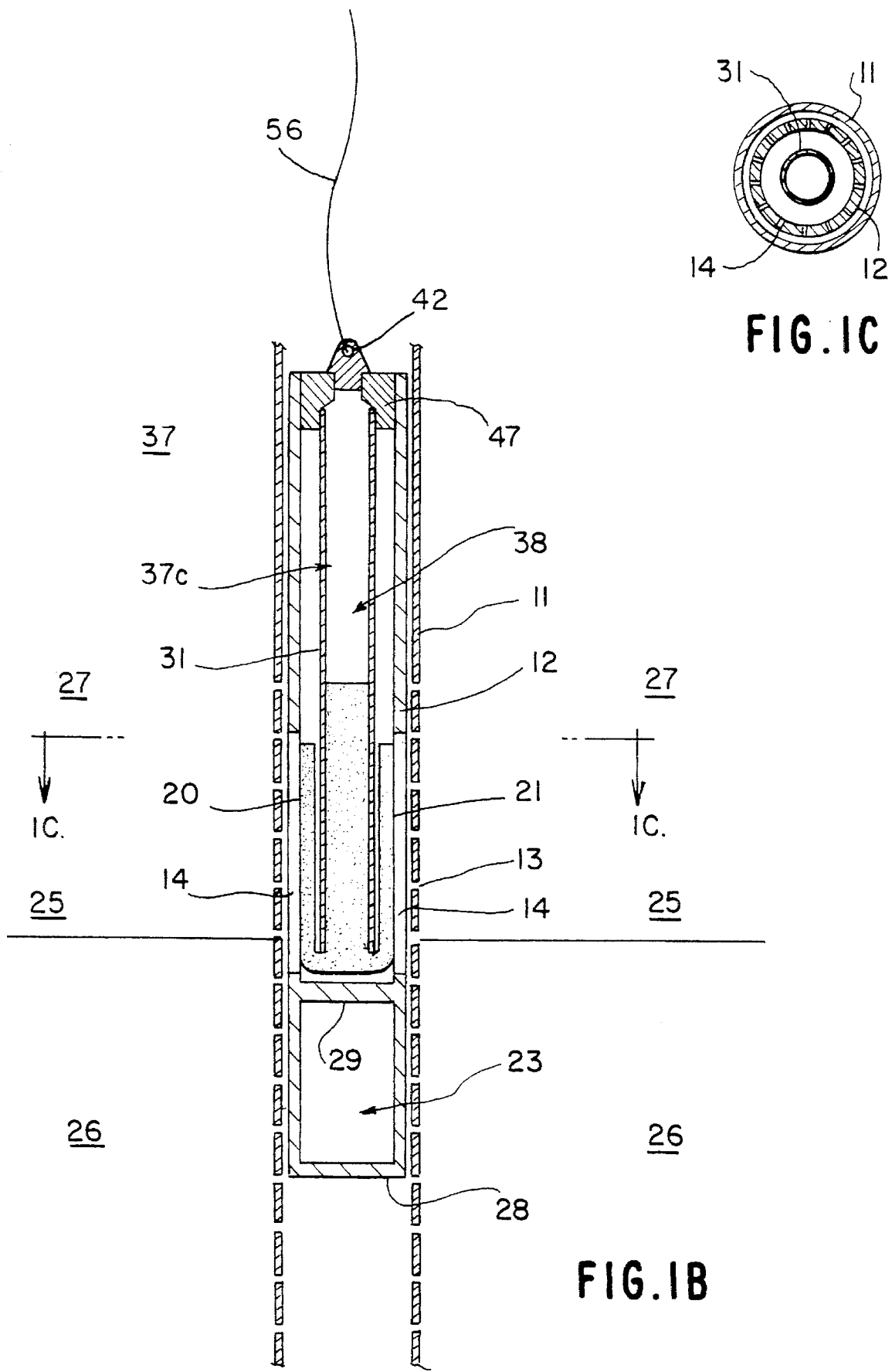
FIG. 1B is a vertical cross section of a second embodiment of an integral floating liquid layer detection system used in groundwater monitoring.
FIG. 1C is a cross sectional view taken along line B—B in FIG. 1B.

Referring to FIG. 1 and FIG. 1A, a floating liquid layer detection and recovery apparatus 10 for groundwater remediation is shown which resides in a conventional well 11, in the soil 27. Well 11 has slots 13 along a portion of its length for passage of groundwater 26 and floating liquid layer 25 (free product) from soil 27 into its interior. Apparatus 10 is free to move with groundwater 26 and floating liquid layer 25 fluctuations by connection of a single coiled tube (not shown) or pair of coiled tubes 16 and 17 (as shown) which communicate with one or more storage tanks or vessels (shown in FIGS. 2, 2A, 2B, 3, 5A, 5B, 5C & 7A & 7B) positioned above apparatus 10. Apparatus 10 is held buoyant by float chamber 23 which is closed at the top by plug 29 and closed at the bottom by plug 28. Plug 28 may be removed so water or other ballast (not shown) may be added to float chamber 23 for precise drafting of ports 21 with respect to the surface of groundwater 26. This makes apparatus 10 suitable for operation in saltwater as well as fresh water and for other flotation influences. Apparatus 10 is first positioned so that ports 21 are just below the surface of the groundwater 26. Slots 14 in the upper portion of body 12 of apparatus 10 accommodate a range of draft when a thicker and less buoyant floating liquid layer 25 is present. The lower opening of downcomer tube 31 is adjacent to the location of ports 21 which serves as an additional non-clogging flow area for floating liquid layer 25 and as a draft positioning reference. Tube 17 is connected to the top of apparatus 10 at plug 18 while tube 16 connects to the top of apparatus 10 at plug 18 and also communicates to tube extension 22 within apparatus 10. The top portion of tubes 16 & 17 are supported adjacent to each other and held fixed by member 24. It should become evident to those skilled in the art that tubes 16 & 17 may be a single tube of a sufficiently larger diameter so long as groundwater 26 and floating liquid layer 25 may flow around one another within that same tube. In operation the inside of downcomer tube 31, tubes 16 and 17, the storage tanks 37a and 37b, and the tubes 33 & 34 (shown in FIGS. 2, 2A, 3, 5A, 5B, & 5C) will be first charged with groundwater 26 or other water 38 and then closed to the atmosphere. Water will flow downward by gravity from one or both tanks 37a and 37b toward the apparatus 10 creating a negative pressure in the system above the uppermost surface of groundwater 26 and floating layer 25 thereon. The floating liquid layer 25 (free product) flows through slots 13 in well casing 11, inward through slots 14 and ports 21 into apparatus 10 where the free product 25 comes in contact with a hydrophobic absorbent filter material 20, preferably a polypropylene micro-fiber. The free product 25 is then absorbed by capillary action both upward and downward on the outside of the downcomer tube 31, under the lower end of downcomer tube 31 and upward on the inside of downcomer tube 31. As free product 25 continues upward through the hydrophobic material 20 on the inside of downcomer tube 31 it will be assisted by siphon action and its lighter than water buoyancy towards the top of absorbent material 20 where it will leave the absorbent material 20, float upward through port 19, upward through tube 17 and flow to a storage tank such as 37a or 37b (shown in FIGS. 2, 2A, 2B, 3, 5A, 5B, 5C, 7A & 7B). The hydrophobic absorbent filter material 20 may be in the form of sheets (shown) or loose pulp (not shown) and is held in position by hollow cylindrical member 30. When the floating liquid layer 25 is of sufficient thickness and extends below the downcomer tube 31 and hollow member 30, the flow will pass upward towards passageway 18 through the annulus space provided by hollow member 30, which is open at both ends. Biofouling of absorbent 20 can only hinder recovery of the thinner floating liquids 25. Resistance to aerobic bio-fouling comes from the reduced exposure of the filter media to air (oxygen). Anti-Bio-fouling chemicals may be added to the water in either tank 37a or 37b for additional safeguard. Groundwater 26 or other water 38 returns from a tank or vessel (shown in FIGS. 2, 2A, 3, 5A, 5B, 5C, 7A & 7B) through tube 16, through tube extension 22, through ports 15 joining groundwater 26 in soil 27. The free product 25 recovery volume is relative to the volume or mass of the stored groundwater 26 or other water 38. It should become apparent, to those skilled in the art, if either tank 37a or tank 37b (shown in FIGS. 2, 2A, 3, 5A, 5B, 5C, 7A & 7B) have zero vapor headspace the exchange of free product 25 and groundwater 25 or other water 38 will be most equal by volume. When a vapor headspace is present in either tank 37a or tank 37b, the exchange of floating product is nearly equal to the mass of groundwater 25 or other water 38 used for the motive force. It becomes apparent also that the only energy required for free product collection, once set in motion, is the initial energy which was required to fill tanks 37a and 37b (shown in FIGS. 2, 2A, 3, 5A, 5B, 5C 7A & 7B).

Referring to FIG. 1B and FIG. 1C, a modified integral floating liquid layer detection apparatus 37 is shown which resides in a conventional well 11, in the soil 27. Well 11 has slots 13 along a portion of its length for passage of groundwater 26 and floating liquid layer 25 (free product) from soil 27 into its interior. Apparatus 37 is free to move with groundwater 26 and floating liquid layer 25 fluctuations as a free buoyant unit. Apparatus 37 is made buoyant by float chamber 23 which is closed at the top by plug 29 and closed at the bottom by plug 28. Plug 28 may be removable so water or other ballast (not shown) may be added to float chamber 23 for precise drafting. This makes apparatus 37 suitable for operation in saltwater as well as fresh water. In operation apparatus 37 is first filled with other water 38 through an opening in member 47 and then closed to the atmosphere by plug 42. Other water 38 will not flow readily by gravity downward from the integral tank 37c and downcomer tube 31 because of tightly packed hydrophobic absorbent filter material 20 is resistance to water absorption. Apparatus 37 is then lowered into well 11 by lanyard 56. Vertical slots 14 in the central portion of apparatus 37 body 12 accommodate uninterrupted recovery throughout the total range of draft when thicker layers of less buoyant floating liquid 25 causes apparatus 37 to sink. The lower opening of downcomer tube 31 protrudes below the surface of groundwater 26 or floating product 25 if present. Downcomer tube 31 also serves as the apparatuses only tank or reservoir 37c. When present, the floating liquid layer (free product) 25 is absorbed by capillary action both upward and downward on the outside of the downcomer tube 31, downward under the lower end of downcomer tube 31 and upward on the inside of downcomer tube 31, it will be assisted by its lighter than water buoyancy to move towards the top of absorbent material 20 where it will leave the absorbent material 20 and float to the top of the reservoir 37c. The displaced water 38 will forced back through the absorbent material 20 outside the apparatus 37 through ports 15. This is an inverted siphon action. The hydrophobic absorbent filter material 20 may be in the form of sheets or loose pulp and is held in place by friction within the downcomer tube 31 and apparatus body 12. The entire apparatus 37 can be removed for monitoring and product recovery. Referring to FIG. 1D and FIG. 1E, being similar to FIGS. 1B and 1C, an integral floating liquid layer detection and recovery apparatus 57 is shown which resides in a conventional well 11, in the soil 27. Well 11 has slots 13 along a portion of its length for passage of groundwater 26 and floating liquid layer 25 (free product) from soil 27 into its interior. Apparatus 57 is free to move with groundwater 26 and floating liquid layer 25 and fluctuates as a free buoyant unit. Apparatus 57 is made buoyant by float chamber 23 which is closed at the top by plug 29 and closed at the bottom by plug 28. Plug 28 may be removable so water or other ballast (not shown) may be added to float chamber 23 for precise drafting. This makes apparatus 57 suitable for operation in saltwater as well as fresh water. Tank 37d of apparatus 57 is first filled with a small volume of other water 38 through the opening in member 47 and allowed to drain until check ball 35 seals on seat member 48. Check ball 35 is made of a material such as polypropylene with a specific gravity of less than 1.0 but greater than the specific gravity of the floating liquid 25. Therefore, the check ball 35 will sink in floating product 25 and float on other water 38. In operation tank 37d is filled with other water 38, the upper pressure of which will keep check ball 35 seated on member 48. Tank 37d is then closed to the atmosphere by plug 42. At first other water 38 will not flow by gravity downward from the integral tank 37d and downcomer tube 31 because check ball 35 is seated. Apparatus 57 is then lowered into well 11 by lanyard 56. Vertical slots 14 in the central portion of apparatus 57 body 12 accommodate uninterrupted recovery throughout the total range of draft when thicker layers of less buoyant floating liquid 25 on groundwater 26 causes apparatus 57 to sink. The lower opening of downcomer tube 31 protrudes significantly below the surface of groundwater 26 or floating product 25 which may be on the order of several inches. Lanyard 56 may limit the initial depth that apparatus 57 sinks. Soon after downcomer tube 31 resides below a liquid surface the pressure above and below check ball 35 will attain equilibrium and check ball 35 will float to the top of other water 38 in tank 37d. The floating liquid layer (free product) 25 is absorbed by capillary action of absorbent material 20 both upward and downward on the outside of the downcomer tube 31, downward and under the lower end of downcomer tube 31 and upward on the inside of downcomer tube 31. As the floating liquid 25 continues upward through the hydrophobic material 20 on the inside of downcomer tube 31 it will be assisted by its lighter than water buoyancy to move towards the top of absorbent material 20 where it will leave the absorbent material 20 and float to the top of tank 37d. This is an inverted siphon action. The hydrophobic absorbent filter material 20 may be in the form of sheets or loose pulp and is held in place by friction between hollow members 30, downcomer tube 31 and apparatus body 12. Thicker layers of floating product 25 may pass directly through hollow member 30 directly upward to tank 37d. As floating product 25 displaces other water 38 apparatus 57 will become more buoyant, rise and may allow slack in lanyard 56. This could be one indication that product has been recovered. Entire apparatus 57 can be removed for monitoring and product recovery. Although this apparatus lacks the feature to recover floating product to the surface or to a much higher point than apparatus 10 with remote tanks 37a and 37b it does have the advantage of residing below freezing zones and in absence of float chamber 23, may recover floating layers on shallow bodies of groundwater 26.

Figure 2:
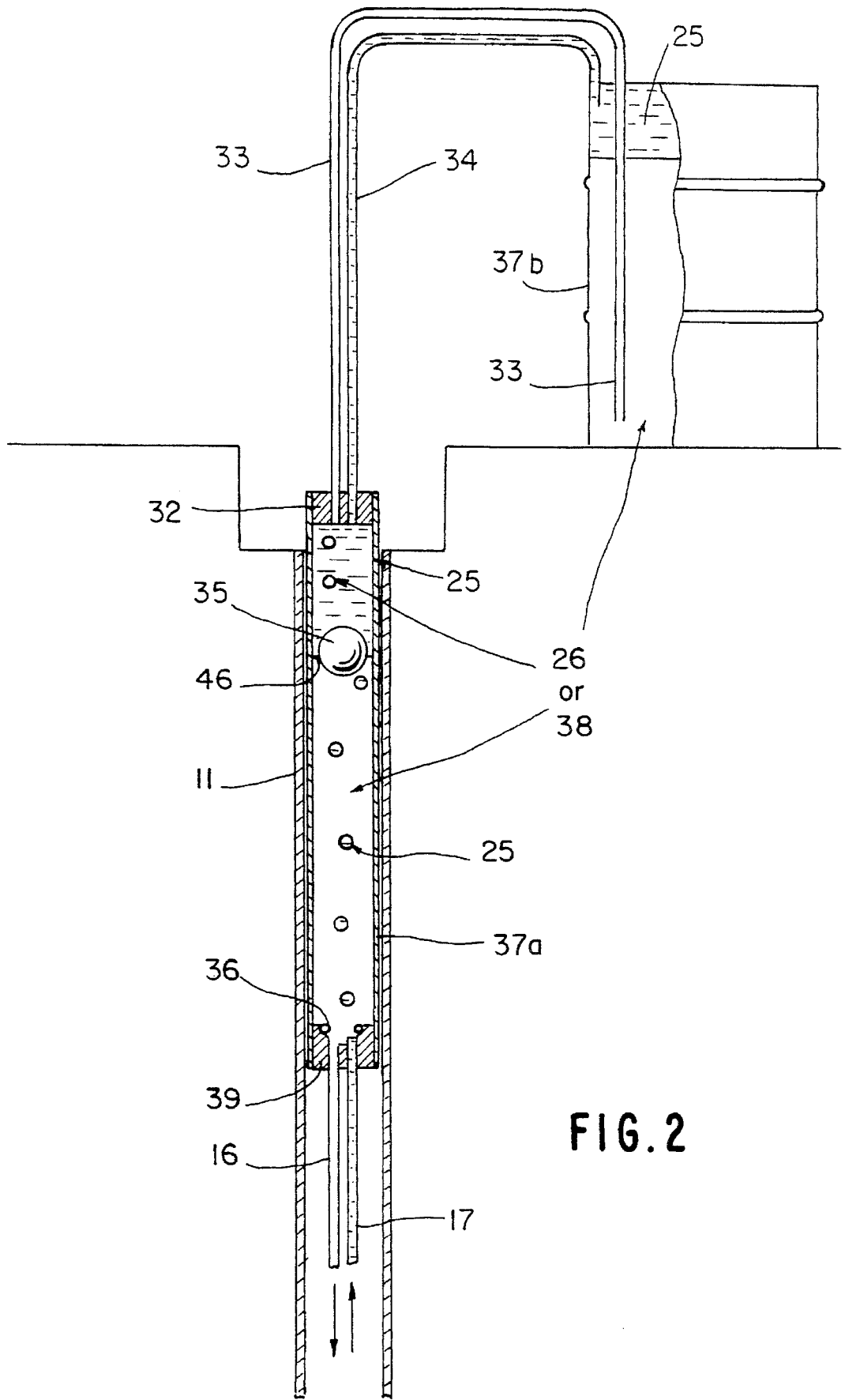
FIG. 2 is a vertical cross section of the "in the well" storage tank or vessel portion of a floating liquid layer recovery system, showing the well in which a storage tank may reside, and an above ground storage tank.

Referring to FIG. 2 the storage tank or vessel portion of the floating liquid layer recovery apparatus is shown. Tubes 16 & 17 connect to the bottom of tank 37a which rests in the upper portion of well 11. Tank 37a is closed at the bottom by plug 39 and is closed at the top by plug 32 which may be connected to tank 37b (a 55 gallon drum is shown) by tubes 33 and 34 at connection points at the top of tank 37a. The system can operate with either tank 37a, tank 37b, both tanks, or with more tanks (not shown). In a preferred invention tank 37a shall be made of a clear material such as clear PVC (poly vinyl chloride) so the device may be used for detection of free product by visual monitoring. Check ball 35, made of polypropylene or other material having a specific gravity less than water (1.0) but greater than the floating liquid 25 will float on the groundwater 26 or other water 38 and sink in the floating liquid layer 25. In operation tank 37a, tank 37b, tubes 16, 17, 33 & 34 and apparatus 10 (FIG. 1) are first filled with groundwater 26 or other water 38 and closed to the atmosphere at the top and open below groundwater 26 and floating liquid layer 25 (FIGS. 1, 3, 5A, 5B & 5C) at the bottom. Water will first flow by downwardly by gravity from one or both tanks 37a and 37b towards apparatus 10 (FIG. 1) creating a negative pressure in the system above the uppermost surface of groundwater 26 thereon. Floating liquid layer 25, which first entered the floating portion of apparatus 10 (as shown in FIG. 1), ascends through tube 17 and floats above groundwater 26 or other water 38 in tank 37a. When tank 37b is used in conjunction with tank 37a, floating liquid layer 25 will flow through tube 34 into tank 37b as displaced groundwater 26 or other water 38 returns downward to tank 37a via tube 33 leading from or near the bottom of tank 37b. Once floating liquid 25 reaches the lower end of tube 33 in tank 37b tube 16 now conveys the floating liquid 25 towards tank 37a and apparatus 10 (FIG. 1). As tank 37a fills, check ball 35 descends with the product to water interface 46 reaching valve seat 36 where all liquid flow above check ball 35 stops. It can been readily seen that check ball 35 may serve as an ornamental interface indicator to distinguish the floating liquid layer 25 interface 46 when both free floating liquid layer 25 and groundwater 26 or other water 38 are equally clear (such as kerosene, or jet fuel verses water) and as a mechanism to prevent the loss of the recovered floating liquid layer 25 from storage. Such will be the case when either tank 37a or tank 37b is opened to atmosphere to remove the recovered floating liquid layer 25, or when apparatus 10 (FIG. 1) resides above a liquid layer at the bottom of downcomer tube 31. Tank 37b or tank 37a when emptied, is refilled with groundwater 26 or other water 38, and closed to the atmosphere to resume product recovery. Tank 37b may be disconnected from tank 37a by installation of self-closing quick connectors on tubes 33 & 34 (not shown) without interruption of product recovery at tank 37a. It should be noted that there are no VOC emissions, the naturally occurring bacteria in groundwater 26 is preserved and does not foul the preferred apparatus, and the discharged groundwater 26 to product recovery ratio is 1:1 or less.

Figure 2A:
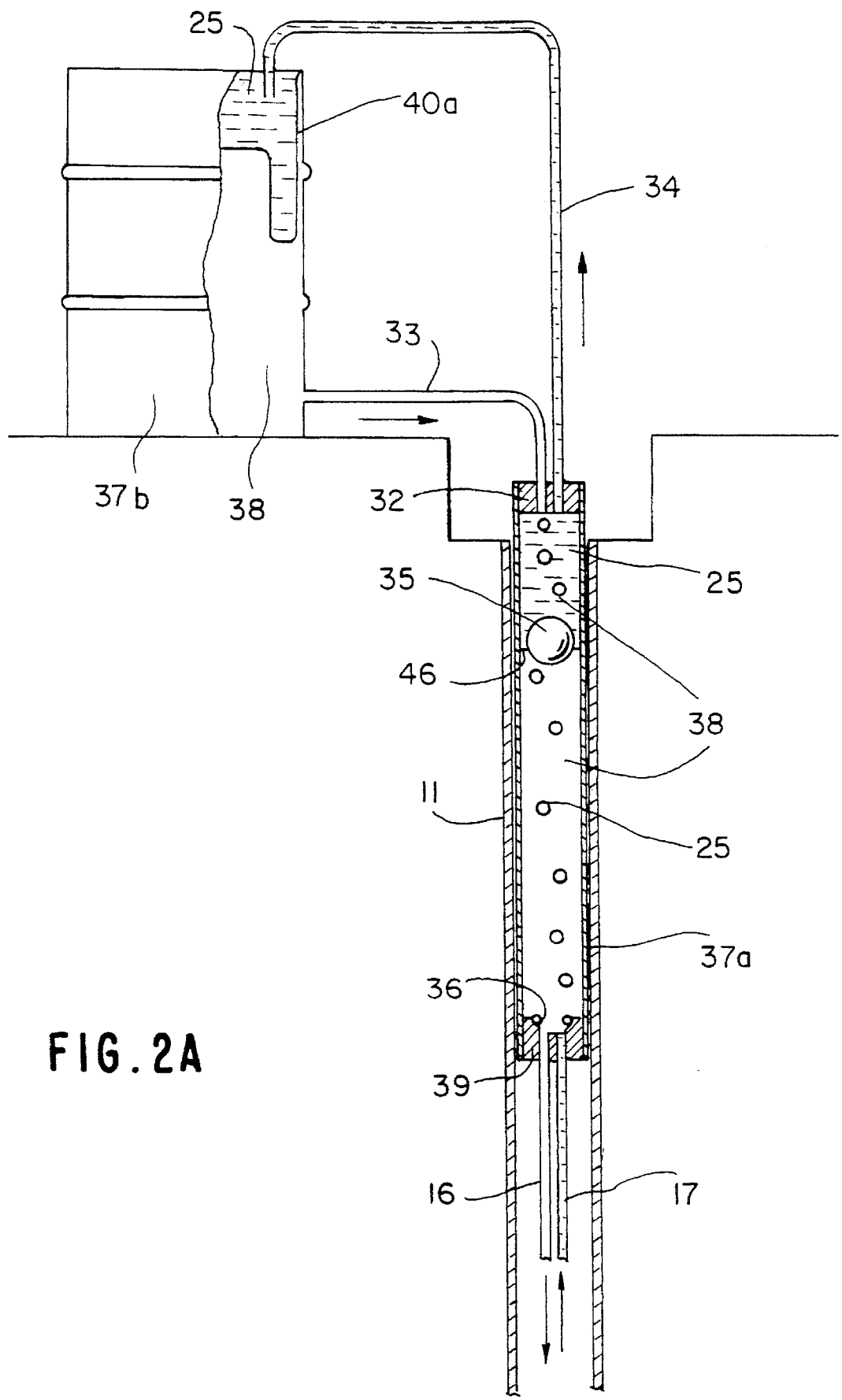
FIG. 2A is a vertical cross section of the "in the well" storage tank or vessel portion of a floating liquid layer recovery system, showing the well in which a storage tank may reside, and an above ground storage tank with an interface membrane barrier.

Referring to FIG. 2A, which is similar to FIG. 2 in most respects, except tank 37b has an impermeable interface membrane 40a. Membrane 40a serves to prevent water soluble constituents found in floating liquid layer 25 from dissolving into other water 38 and reaching ground water 26 (FIG. 1).

Figure 2B:
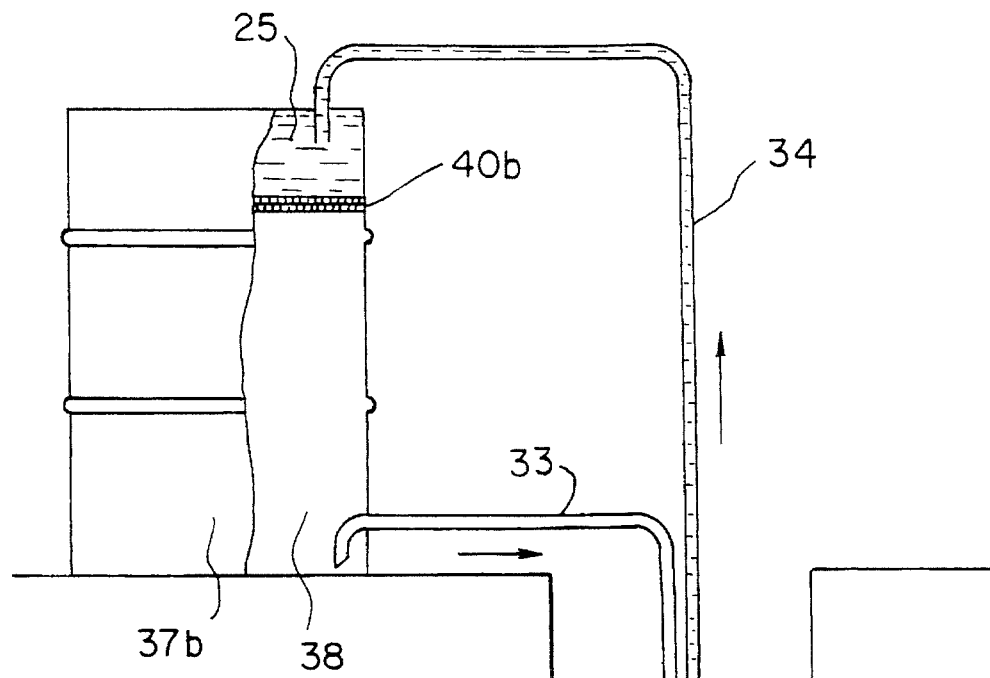
FIG. 2B is a vertical cross section of the storage tank of a floating liquid layer recovery system with a modified interface barrier comprised of floating beads.

Referring to FIG. 2B, which is the same as FIG. 2A in most respects, except tank 37a (FIGS. 2, 2A, 3, 5A & 5B), has not been incorporated and 37b has an interface comprised of floating beads 40b instead of an impermeable membrane 40 (FIG. 2A). The absence of tank 37a (FIG. 2, 2A, 5A and 5B) is to show that the system can function with one or more above ground tanks only. Floating beads 40b serves to reduce the water soluble constituents, found in floating liquid layer 25, from dissolving into other water 38 and reaching groundwater 26 (FIG. 1). Tubes 16 & 17 connect to tubes 33 and 34 respectively. In operation beads 40b will float on other water 38 in tank 37b reducing the interface area between either water 38 and floating product 25. The absence of tank 37a (not shown) configuration may be used in systems referred to in FIGS. 2, 2A, & 5C).

Referring to FIG. 3 a preferred embodiment 10 and tank 37a are shown residing in up gradient well 11a, with tubes 33 and 34 in commutation with tank 37b above the ground surface. Tube 41a leads from the bottom of tank 37b to check ball assembly 54, to tube 41b to well 11b and terminates at point 43 which shall be lower than watertable 39b. Check ball assembly 54 allows water to flow through but closes the flow of floating product. Before operation, watertable 26 ranged from 39a at well 11a with a descending gradient to 39b at well 11b. In operation, a first liquid siphon 52 is started up tube 17, through tank 37a, through tube 34, into tank 37b, back through tube 33, through tank 37a, through tube 16 to apparatus 10, which is below the surface of watertable 39a. Next a second siphon 53 is started from tank 37b through tubes 41a and 41b which exits below the surface of watertable 39b at point 43. A cone of depression is created at 60a with a radius of response around well 11a dependent upon the motive force of the second siphon 53 through tube 41a–41b and natural groundwater budget (not shown). Likewise, the watertable will rise to 60b in a radius of response around well 11b. This influences lighter mobile floating liquids to migrate towards well 11a in greater volumes and thicknesses but less so or not at all towards well 11b. When the second siphon 53 has sufficient motive force it will overcome the downward flow of siphon 52 through tubes 33 and 16 and reverse it to an upward flow. Floating liquid 25 may also assume this upward path through tube 16, through tank 37a and through tube 33 to tank 37b. Treatment of water 26 or other water 38 (as shown in FIGS. 1 & 2) after check ball assembly 54 and before discharge point 43 may be desired because it may contain excessive levels of dissolved contaminants known as MCLs (maximum contaminate levels).

Figure 4:
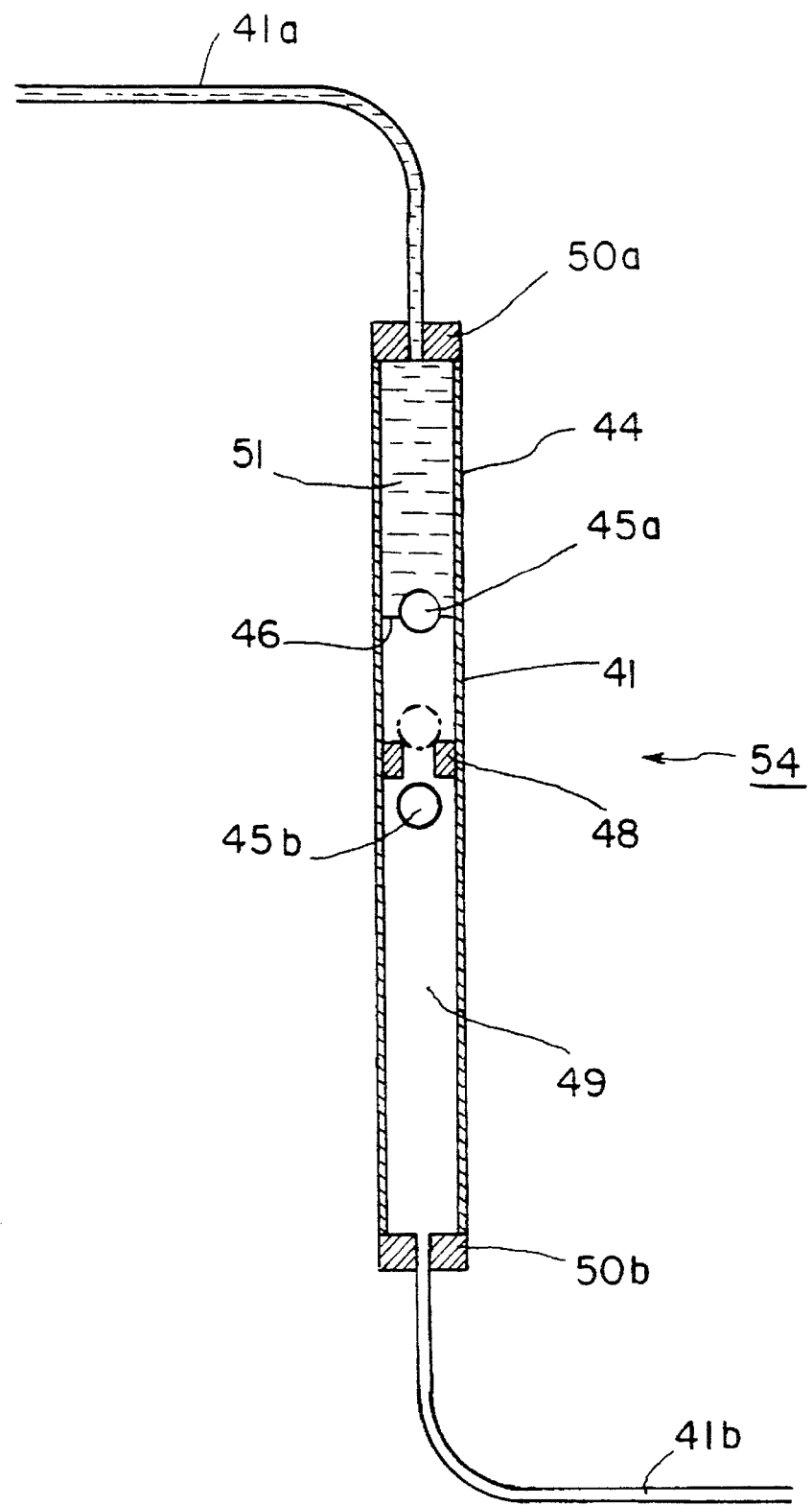
FIG. 4 is a detailed vertical cross section of the means to prevent the recovered floating liquid from entering a down gradient point or well.

Referring to FIG. 4 check valve assembly 54 is shown which is comprised of a clear hollow member 44, such as clear PVC, being closed at opposite ends by plug 50a at the top and by ball seat and plug 50b at the bottom. Tube 41a communicates to the check valve assembly 54 at the top. Tube 41b communicates from the check valve assembly 54 at the bottom. Within the overall length of hollow member 44 is center valve seat 48, above which is check ball 45a and below is check ball 45b. Check balls 45a and 45b may be constructed of polypropylene so long as the overall specific gravity is less than water 49 but greater than the recovered floating liquid layer 51. In operation siphoned liquids flow through tube 41a into the top of assembly 54 through plug 50a, down through hollow member 44, through the passageway in valve seat 48 and exits to tube 41b at the bottom through ball seat and plug 50b. When the flow of liquid is water 49, check balls 45a and 45b will float within their respective chambers of check valve assembly 54. When the recovered floating liquid 51 flows into assembly 54 interface 46 is first established at check ball 45a. With continued influx of floating liquid 51, water 49 is displaced downwards. When check ball 45a reaches valve seat 48 the liquid flow will stop. In operation floating liquid 51 is present in the upper section of clear hollow member 44 only. The lower portion below valve seat 48 should contain only water for differential observation. The lower section may also retain a volume of floating liquid 51 as a secondary precaution against a release in the event check ball 45a has not completely stopped the flow. If so, check ball 45b serves as a redundant flow check when it seats on bottom seat and plug 50b.

Figure 5A:
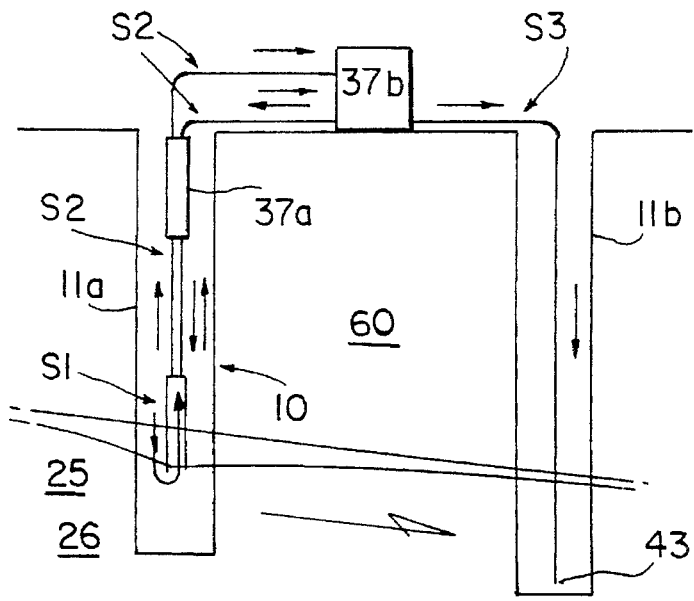
FIGS. 5A, 5B and 5C are schematic views of the preferred system showing two or more siphons.
Figure 5B:
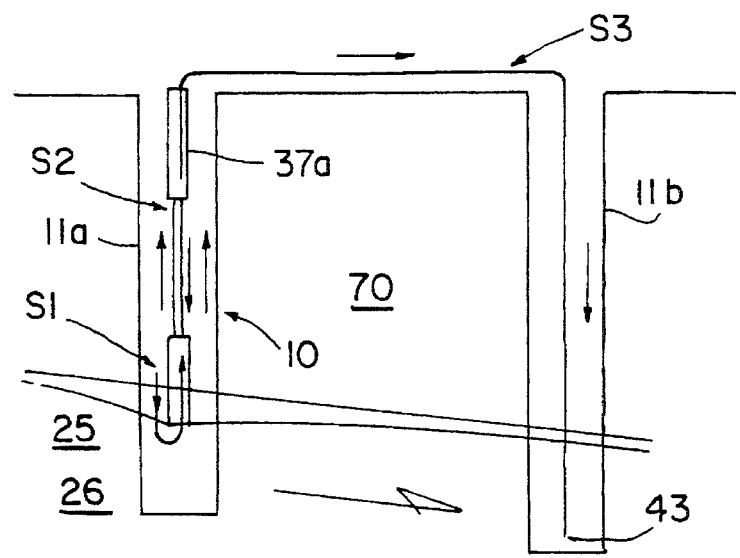
Figure 5C:
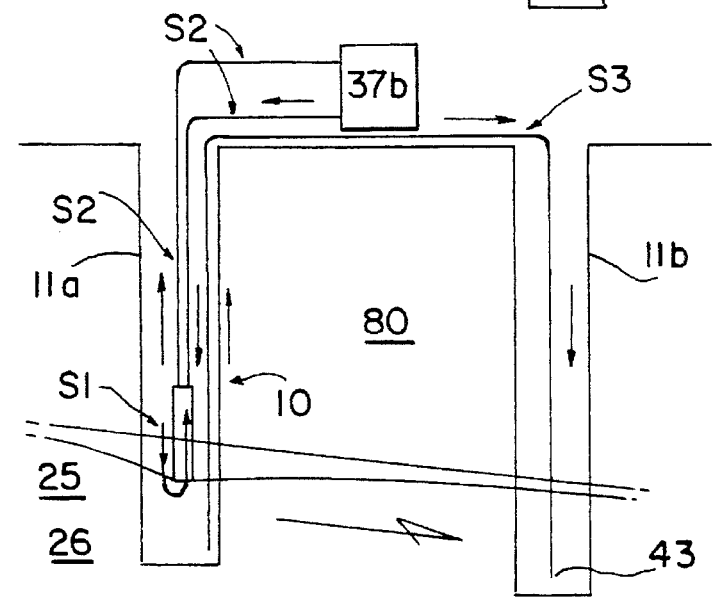

Referring to FIG. 5A, 5B and 5C, three systems 60, 70 and 80 are shown in schematic form wherein apparatus 10 receives floating product 25, from well 11a, in a first inverted siphon S1, with a second siphon S2 to a tank or tanks leading back to apparatus 10 and a third siphon S3 to well 11b being discharged at point 43.

In system 60, an upward siphon flow of floating liquid, indicated by arrows, shows second siphon flow S2 leading from apparatus 10, through tank 37a, to tank 37b and back downwards towards apparatus 10. Third siphon S3 provides motive force water from the bottom of tank 37b to down gradient well 11b which is discharged at point 43. When third siphon S3 has sufficient force it will overcome the downward flow of second siphon S2 in well 11a and reverse it to an upward flow.

In system 70, an upward siphon flow of floating liquid, indicated by arrows, shows second siphon S2 leading from apparatus 10, to tank 37a and back downward to apparatus 10. Third siphon S3 provides motive force water from within tank 37a to down gradient well 11b being discharged at point 43. When the third siphon S3 has sufficient motive force it will overcome the downward flow of second siphon S2 within well 11a and reverse it to an upward flow.

In system 80, an upward siphon flow of floating liquid, indicated by arrows, shows second siphon S2 leading from apparatus 10 to tank 37b and back downward to apparatus 10. Third siphon S3, provides motive force water from a point below floating liquid layer 25 in well 11a directly to down gradient well 11b being discharged at point 43. Third siphon S3 may be used without apparatus 10 as a means for deterring floating product 25 migration from the area of well 11a to the area of well 11b.

Referring to FIG. 6 and 6A, circular floating apparatus 71, used for open water spill and release cleanup, is shown floating on floating liquid layer 25 over an open body of water 65. Apparatus 71 is comprised of floating body 63 made from a buoyant material such as polypropylene with most of it buoyancy found located about its outermost circumference for stability purposes and is closed at the bottom by plug 28. A multitude of slots 14 around the outer circumference of apparatus 71 form annulus chamber 67. Chamber 67 is enclosed at the top by cover 66 and allows floating product to seek a more stable and uniform thickness within the chamber as it flows towards downcomer tube 31. Downcomer tube 31 forms the central annulus within body 63 being closed at the top by plug 39, open at the bottom which extends below the liquid surface and forms closed chamber 68. Tubes 16 and 17 lead to and from apparatus 71 at the top of plug 39 with direct of flow shown by arrows. Hydrophobic absorbent filter material 20, preferably a polypropylene micro-fiber, extends from chamber 67 under the lower end of downcomer tube 31 up and into closed chamber 68. In operation a tank or vessel at an elevated location (not shown) is filled with water 65 or other water 38 (not shown) and closed to the atmosphere with tubes 16 and 17 commutating to and from apparatus 71 or tube 16a leading to water 65 and tube 17 commutating from apparatus 71. Once tank (not shown) is closed to the atmosphere a flow of water 25 or other water 38 (not shown) flow through tubes 16 or 16a creates a negative pressure in the flow system from the tank (not shown) to the closed chamber 68. Floating liquid layer 25, when of sufficient thickness, will enter slots 14, flow under the lower end of downcomer tube 31, flow upward through port 19, and through tube 17 to tank (not shown). Displaced water from tank (not shown) flows back to water 65 via tube 16 to apparatus 71 exiting tube extension 22 or through tube 16a directly to water 65.

Floating layers are also absorbed by capillary along absorbent 20 and pass under the lower end of downcomer tube 31 and secondly upward on the inside of downcomer tube 31. As the free product 25 continues upward through the hydrophobic material 20 on the inside of downcomer tube 31, it will be assisted by siphon action and its lighter than water buoyancy towards the top of absorbent material 20 where it will leave the absorbent material 20, float upward through water 65 or other water 38, through port 19, and then flow upward through tube 17 and to a tank or vessel (not shown). The hydrophobic absorbent filter material 20 is shown in the form of strips. Once downcomer tube 31 no longer extends into the floating liquid layer 25 remaining product recovery is completed by absorbent 20.

Figure 7A:
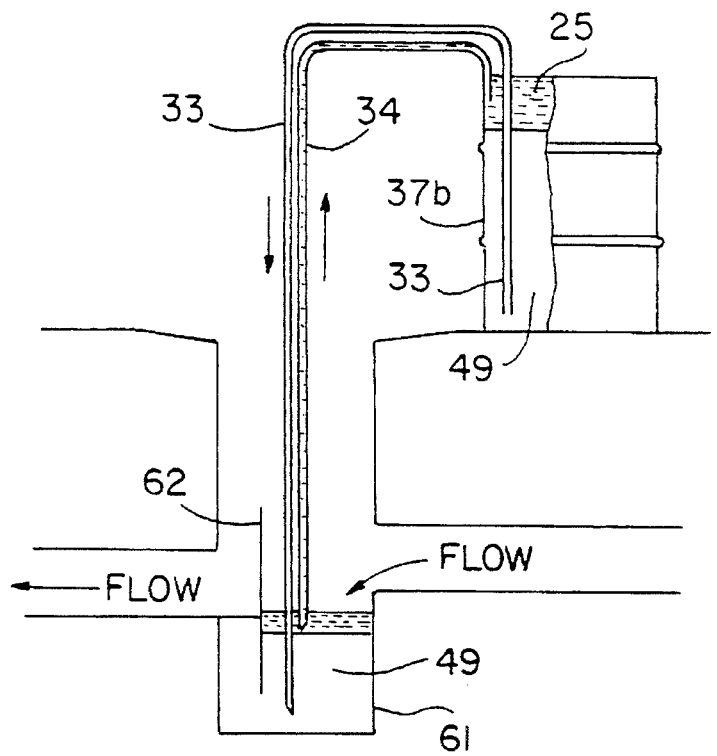
FIGS. 7A and 7B are schematic views of a modified recovery system wherein the floating liquid is removed from a sump by means of a fixed siphon apparatus.

Referring to FIG. 7A, apparatus 81 used for oil recovery from a sump is shown with fixed downcomer tube 31 positioned within floating liquid layer 25 above water 49 in sump 61. Floating layer 25 is retained in sump 61 by baffle 62 whereas water 49 is allowed to flow as indicated by flow arrows. Tubes 33 and 34 communicate with tank 37b at an elevated location. In operation tank 37b is filled with water 49 and closed to the atmosphere. Once tank 37b is closed to the atmosphere a flow of water 49 flows through tubes 16 and 17 creates a negative pressure within the flow system. Floating liquid layer 25, when of sufficient thickness, will enter lower end of downcomer tube 31, through tube 34 to tank 37b. Displaced water from tank 37b flows back to water 61 via tube 33 exiting below the liquid surface.

Figure 7B:
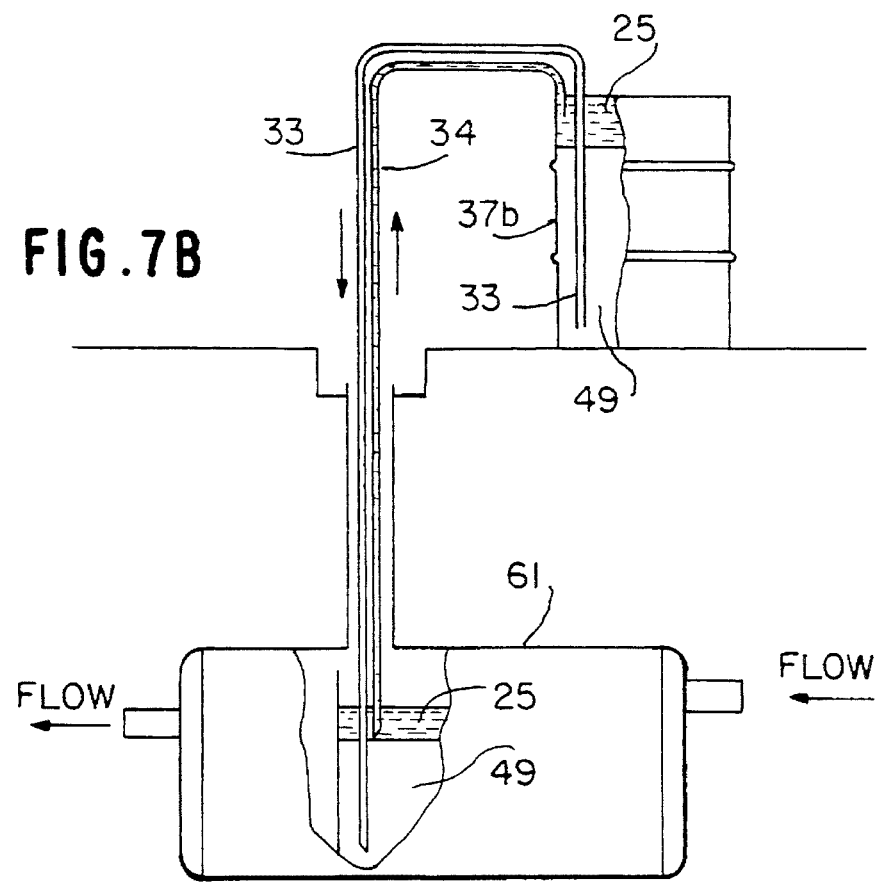

Referring to FIG. 7B, apparatus 91 used for oil recovery from a flow system sump 61 as indicated by flow arrows is shown with fixed downcomer tube 34 positioned within floating liquid layer 25 above water 49 in sump 61. Tubes 33 and 34 communicate with tank 37b at the top. In operation tank 37b at an elevated location is filled with water 49 and closed to the atmosphere. Once tank 37b is closed to the atmosphere a flow of water 49 flows through tubes 33 and 34 creates a negative pressure within the flow system. Floating liquid layer 25, when of sufficient thickness, will enter lower end of downcomer tube 31, flow through tube 34 to tank 37b. Displaced water from tank 37b flows back to water 61 via tube 33 exiting downcomer tube 31 below the liquid surface.

Occasionally, undesirable releases occur where the liquid sinks in water, is not soluble in water and does not react with water. One example is trichloroethylene with a specific gravity of 1.46 and solubilty of 0.1% at 77° F. in water. Another example is #6 fuel oil which may have a specific gravity greater than 1.0 at temperatures above 84° F. and a specific gravity less than 1.0 below 84° F. Pumps are often used to recover sinking liquids providing there is some type of collecting basin beneath the water for collecting the sinking liquid in a concentrated form.

The present invention is also suitable for siphoning and recovering such a sinking liquid. A first sinking liquid having a higher specific gravity than water is siphoned to a higher point directly to a tank or vessel wherein a second liquid having a higher specific gravity is located. Thus the first sinking liquid will become a floating liquid on the second heavier liquid since they are separated by specific gravity. The heaviest liquid completes the remaining portion of the siphon back to a point of lower pressure below the he first sinking liquid layer. Thus the system would be a semi-closed specific gravity siphon with the liquid to be collected being closed to atmospheric pressure and the stored liquid being closed to the atmospheric pressure. Thus, the principle of collecting the sinking liquid which is heavier than water, is the same as applied to the collection of a liquid layer floating on water. The heaviest liquid from the tank will move downwardly through a tube under the force of gravity into the collection basin where the sinking liquid has been collected beneath the body of water. Thus the sinking liquid will then float on the heaviest liquid and can be siphoned upwardly to the surface tank where it will then float on the heaviest liquid.

While the invention has been particularly shown and described with reference to preferred embodiments thereof, it will be understood by those skilled in the art that the foregoing and other changes in the form and detail may be made therein without departing from the spirit and scope of the invention.

What is claimed is:

1. A floating liquid layer detection and recovery system comprising a floating assembly adapted to float in a well adjacent an upper surface of groundwater having a floating liquid layer thereon, a first tank adapted to be disposed in the well above said floating assembly and first syphon means interconnecting said floating assembly and said first tank to raise the floating liquid from the layer on the groundwater to said first tank.

2. A system as set forth in claim 1 wherein said floating assembly is comprised of a hollow cylindrical member having a lower sealed chamber to provide buoyancy, an upper chamber disposed in communication with fluid in the well through perforation in said hollow cylindrical member and a downcomer tube disposed in said upper chamber with an open lower end adapted to be disposed in the floating liquid layer on the groundwater.

3. A system as set forth in claim 2, further comprising capillary means disposed on an external surface of said downcomer tube and extending through said lower open end and extending upwardly of said downcomer tube on an internal surface thereof for moving said floating liquid upwardly adjacent a top end of said downcomer tube by capillary action.

4. A system as set forth in claim 3, wherein said first syphon means is comprised of a first tube connected to a lower end of said first tank and said top end of said downcomer tube and a second tube connected to said lower end of said first tank and extending downwardly through said downcomer tube to a point intermediate said bottom open end of said downcomer tube and said sealed chamber in said floating assembly.

5. A system as set forth in claim 4, wherein said first tank comprises an upper end member and a lower end member to which said first and second tubes extend, a valve seat on said lower end member surrounding upper ends of said first and second tubes and a floating ball in said first tank adapted to float at an interface between the groundwater and the floating liquid layer and adapted to seat on said valve seat upon filling of said first tank with said floating liquid.

6. A system as set forth in claim 1, further comprising a second tank adapted to be disposed above ground and second syphon means interconnecting said first tank and said second tank for transferring floating liquid collected in said first tank to said second tank.

7. A system as set forth in claim 6, wherein said second syphon means is comprised of a first tube having an inlet end in a top end of said first tank and an outlet end adjacent a top end of said second tank and a second tube having an inlet end adjacent a bottom end of said second tank and an outlet end in said top end of said first tank.

8. A system as set forth in claim 7, further comprising third syphon means comprising a tube having an inlet end disposed adjacent said bottom end of said second tank and an outlet end adapted to be disposed in a further well below a groundwater level therein.

9. A method for detecting and recovering a floating liquid layer floating on an upper surface of groundwater comprising:

providing a first well extending below said upper surface of said groundwater;

floating a collecting tube on said groundwater with a lower open end of said collecting tube disposed below an upper surface of said floating liquid layer and a first collecting tank above said collecting tube in said well and syphoning said floating liquid from said floating liquid layer into said first collecting tank.

10. A method as set forth in claim 9, further comprising providing a second collecting tank above ground and syphoning said floating liquid collected in said first collecting tank into said second collecting tank.

11. A method as set forth in claim 10, further comprising syphoning water in said second collecting tank below said floating liquid into a second well at a point below groundwater level.

12. A floating liquid layer recovery system for recovering liquid floating on an open body of water comprising an annular ring of floatation material having a top cover member and bottom member defining a first main chamber, passages extending through said floatation material to allow the floating liquid to enter the main chamber, a downcomer tube extending downwardly from said cover member and having an open lower end adapted to extend below an upper surface of the floating liquid capillary means supported by said annular rind and extending beneath said tube and upwardly into a second chamber in said tube for collecting the floating liquid, a first conduit in communication with an upper portion of said second chamber and an upper end of a collecting tank at a higher elevation than said ring for delivering said floating liquid to said tank and a second conduit in communication with a bottom portion of said collecting tank for conducting water from said tank to said body of water.

* * * * *